United States Patent
Walker

(10) Patent No.: US 11,227,005 B2
(45) Date of Patent: Jan. 18, 2022

(54) GESTURE-BASED DATABASE ACTIONS

(71) Applicant: salesforce.com, inc., San Francisco, CA (US)

(72) Inventor: Josh Walker, San Francisco, CA (US)

(73) Assignee: salesforce.com, inc.

(*) Notice: Subject to any disclaimer, the term of this patent is extended or adjusted under 35 U.S.C. 154(b) by 1072 days.

(21) Appl. No.: 15/198,290

(22) Filed: Jun. 30, 2016

(65) Prior Publication Data

US 2018/0004780 A1  Jan. 4, 2018

(51) Int. Cl.
*G06F 16/435* (2019.01)
*G06F 3/0488* (2013.01)
*G06F 16/242* (2019.01)
*G06F 16/21* (2019.01)

(52) U.S. Cl.
CPC ........ *G06F 16/436* (2019.01); *G06F 3/04883* (2013.01); *G06F 16/213* (2019.01); *G06F 16/242* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,590,219 A * | 12/1996 | Gourdol .............. G06F 3/04883 382/187 |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |

(Continued)

*Primary Examiner* — Neveen Abel Jalil
*Assistant Examiner* — John J Morris
(74) *Attorney, Agent, or Firm* — LKGlobal | Lorenz & Kopf, LLP

(57) ABSTRACT

Computing systems and related methods are provided for performing database actions responsive to input gestures made by a user. One exemplary method involves a server identifying a gesture on a graphical user interface display on a client device, identifying a subset of displayed content on the graphical user interface display corresponding to the gesture, determining a database action based on at least one of characteristics associated with the gesture and the gestured content, performing the database action with respect to an object in a database, and updating the gestured content on the graphical user interface display to reflect performance of the database action.

20 Claims, 12 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,552,889 B2 | 10/2013 | Lutz et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1* | 4/2009 | Jakobson ................. G06F 16/29 715/733 |
| 2009/0177744 A1 | 7/2009 | Marlow et al. |
| 2010/0198787 A1* | 8/2010 | Robertson ............. G06F 21/316 707/634 |
| 2011/0196864 A1* | 8/2011 | Mason .................. G06F 3/0416 707/728 |
| 2011/0247051 A1 | 10/2011 | Bulumulla et al. |
| 2012/0042218 A1 | 2/2012 | Cinarkaya et al. |
| 2012/0131520 A1* | 5/2012 | Tang .................... G06K 9/2081 715/863 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0245200 A1* | 8/2014 | Holz ........................ G06F 3/017 715/764 |

* cited by examiner

Meeting Notes

Related [*] ▸ Search Leads

B  /  U  S  |  ≡  ☰  ≡  ≡  |  ≣  ≣
🖼 for account: Fleem Ltd ——404
attending: Bob Bobson, [📇 Sam Handwich ✕] Milo Farnsworth
                        402                    406

We talked about important business things like:
- suits
- ties
- nice shoes
- synergizing things proactively Action Items:
- Going forward, Bob is in charge of synergizing
- Sam is in charge of nice shoes
- Invite Andy Smith to the next meeting so we can look at his suit
- Milo is in charge of proactiveness after he returns from vacation on the 11th of March|

GESTURE-BASED DATABASE ACTIONS

TECHNICAL FIELD

Embodiments of the subject matter described herein relate generally to computer systems, and more particularly, to methods and systems for performing database actions in response to gestures in a content-sensitive or context-sensitive manner.

BACKGROUND

Many modern computers and electronic devices include input devices that support tactile or gestural user inputs, which some users may find more convenient or intuitive than traditional keyboard, button, or other device-based input. While integration of tactile or gestural user inputs for relatively simplistic operations such as scrolling is relatively straightforward and intuitive, software applications having higher degrees of complexity or supporting a broad range of functionality and operations, such as customer relationship management (CRM) applications, multi-tenant applications, big data applications, and the like are still largely reliant on traditional input interfacing. However, as consumer expectations evolve, perceived overreliance on traditional input interface devices could eventually frustrate users, who may perceive usage of such input devices as being outmoded or who prefer to utilize electronic devices lacking such traditional input interface devices, such as tablet computers. Accordingly, it is desirable to incorporate tactile or gestural user inputs and help obviate the need for traditional input interface devices for achieving more complex functionality.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 3-11 depict exemplary graphical user interface (GUI) displays suitable for presentation on a client device in conjunction with the gesture recognition process of FIG. 2 in accordance with one or more exemplary embodiments.

DETAILED DESCRIPTION

Embodiments of the subject matter described herein generally relate to methods and systems for performing database actions responsive to gestures in a manner that is influenced by the spatial characteristics of the respective gestures as well as the context of the respective gestures, as determined based on the textual information or other information implicated by a respective gesture. It should be noted that although one or more embodiments may be described herein in the context of a virtual application in a database system, the subject matter is not necessarily so limited, and in practice, may be implemented in an equivalent manner in any number of different application systems, on-demand systems, cloud computing systems, and the like, and in the context of any type of document, computer file or other resource that includes, presents, or otherwise displays a graphical user interface (GUI) display associated with a user interface capable of receiving input pertaining to the GUI display.

In exemplary embodiments described herein, a gesture on or associated with a GUI display is identified, and an action to be performed with respect to a database in response to the gesture is identified based on the spatial characteristics of the gesture as well as the displayed information implicated by the gesture. For example, each gesture may be defined as a combination of geometric and directional characteristics, which, in turn, may be utilized to identify or otherwise determine the database action to be performed based on the content associated with the gesture. In this regard, the number and type of database objects implicated by the gesture may dictate the database action triggered by that gesture with respect to those database object(s). For example, when the gesture indicates textual information that does not include or correspond to a recognized database object, the geometric and directional characteristics may indicate whether to query the database for a database object matching the indicated textual information or create a new database object in the database corresponding to the indicated textual information. Conversely, when the gesture indicates one or more existing database objects, the geometric and directional characteristics may indicate what action to be performed with respect to those database object(s). In this manner, the gesture-initiated database actions are context-sensitive with respect to the textual information or other displayed information indicated or otherwise implicated by the respective gesture.

Figure 1:
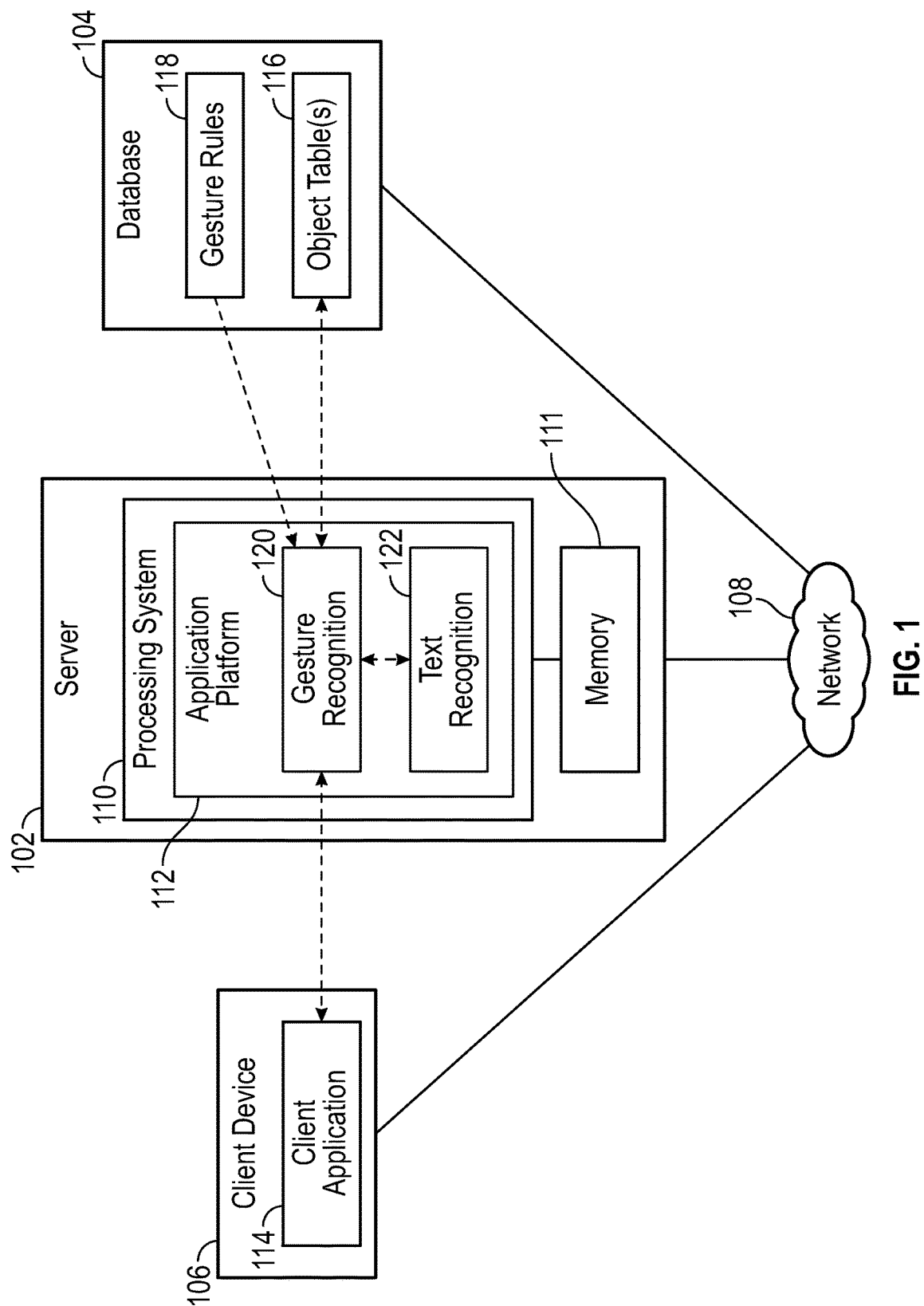
FIG. 1 is a block diagram of an exemplary computing system.

FIG. 1 depicts an exemplary embodiment of a computing system 100 suitable for performing actions with respect to objects in a database 104 in response to input gestures by a user of a client device 106. The illustrated computing system 100 includes, without limitation, an application server 102 that includes or otherwise implements an application platform 112 capable of generating one or more instances of a virtual application at run-time (or "on-demand") provided to one or more client devices 106 communicatively coupled to the application server 102 via a communications network 108, such as a wired and/or wireless computer network, a cellular network, a mobile broadband network, a radio network, or the like. As described in greater detail below in the context of FIG. 12, in one or more exemplary embodiments, the application server 102 generates the virtual application(s) based at least in part upon platform application code and other data stored or otherwise maintained by the database 104 that is communicatively coupled to the application server 102 via the communications network 108. In this regard, the application server 102 and the database 104 may be cooperatively configured to provide a cloud computing platform (or framework).

In the illustrated embodiment of FIG. 1, the application server 102 generally represents a computing system or another combination of processing logic, circuitry, hardware, and/or other components configured to support the gesture recognition processes, tasks, operations, and/or functions described herein. In this regard, the application server 102 includes a processing system 110, which may be implemented using any suitable processing system and/or device, such as, for example, one or more processors, central processing units (CPUs), controllers, microprocessors, microcontrollers, processing cores and/or other hardware computing resources configured to support the operation of the processing system 110 described herein. The processing system 110 may include or otherwise access a data storage element 111 (or memory) capable of storing programming instructions for execution by the processing system 110, that, when read and executed, cause processing system 110 to create, generate, or otherwise facilitate the application platform 112 that generates or otherwise provides instances of the virtual application at run-time (or "on-demand") based at least in part upon code and other data that is stored or otherwise maintained by the database 104. Depending on the embodiment, the memory 111 may be realized as a random access memory (RAM), read only memory (ROM), flash memory, magnetic or optical mass storage, or any other suitable non-transitory short or long term data storage or other computer-readable media, and/or any suitable combination thereof. In the illustrated embodiment, the executable instructions, when read and executed by the processing system 110, cause the processing system 110 to generate or otherwise provide a gesture recognition engine 120 and a text recognition engine 122 which may be integrated into the virtual application.

The client device 106 generally represents an electronic device coupled to the network 108 that may be utilized by a user to access the application platform 112 on the application server 102. In practice, the client device 106 can be realized as any sort of personal computer, mobile telephone, tablet or other network-enabled electronic device that includes a display device, such as a monitor, screen, or another conventional electronic display, capable of graphically presenting data and/or information provided by the application platform 112 along with a user input device, such as a touchscreen, a touch panel, a mouse, a joystick, a directional pad, a motion sensor, or the like, capable of receiving gestural input from the user of the client device 106. A user manipulates the client device 106 to execute a client application 114 that contacts the application server 102 and/or application platform 112 using a networking protocol, such as the hypertext transport protocol (HTTP) or the like, to access or otherwise initiate an instance of a virtual application presented within the client application 114. As described in greater detail below in the context of FIGS. 3-11, the user manipulates an input device to perform gestures on or within the virtual application presented within the client application 114, which, in turn, cause the application server 102 to perform one or more actions with respect to the database 104 based on the spatial characteristics of the gestures and the displayed content associated with those gestures.

In exemplary embodiments, the database 104 includes a plurality of different object tables 116 configured to store or otherwise maintain alphanumeric values, metadata, or other descriptive information that define a particular instance of a respective type of object associated with a respective object table 116. For example, the virtual application may support a number of different types of objects that may be incorporated into or otherwise depicted or manipulated by the virtual application, with each different type of object having a corresponding object table 116 that includes columns or fields corresponding to the different parameters or criteria that define a particular instance of that object.

In accordance with one or more embodiments, the database 104 is realized as a multi-tenant database that is shared between multiple tenants, with each tenant having its own set of associated users, its own associated data that is logically separate or otherwise isolated from data belonging to other tenants, and its own associated application code that may be integrated with the platform code to provide a customized tenant-specific user experience for users associated with that tenant. In such embodiments, the database 104 may store or otherwise maintain data and/or code associated with a number of different tenants and restricts each tenant's access to other tenants' data (or alternatively, restricts accessibility of each tenant's data with respect to other tenants), for example, as described in greater detail below in the context of FIG. 12. In this regard, in some embodiments, custom or tenant-specific objects may be created and integrated into instances of the virtual application associated with a particular tenant, where each of those custom objects may also have a corresponding object table 116 associated therewith maintained by the database 104.

In the illustrated embodiment, the database 104 also includes one or more gesture rules tables 118 configured to store or otherwise maintain an association between spatial characteristics of a gesture, the type of database object(s) implicated by the gesture, and the corresponding database action to be performed in response to an input gesture. In this regard, the spatial characteristics may include geometric characteristics, such as the shape of the gesture, along with directional information associated with the gesture (e.g., clockwise, counterclockwise, and the like). For each unique combination of geometric characteristics and directionality, one or more database actions may be assigned based on the type and/or number of database object(s) implicated by the gesture. In general, a gesture may implicate a database object by overlapping, encompassing, terminating on or initiating from, being directed to or from, or otherwise being collocated with a graphical representation of that database object presented on the client device 106 within the client application 114.

For example, a gesture that does not implicate any existing database objects presented on the client device 106 may be assigned or otherwise associated with a first database action, such as, for example, creating a new database object of a particular type based on the displayed content associated with the gesture or querying for an existing database object of a particular type based on the displayed content associated with the gesture. Conversely, when that gesture implicates one or more existing database objects presented on the client device 106, the gesture rules tables 118 may assign or otherwise associate a different database action with respect to those existing database object(s), such as, for example, establishing a desired association or relationship between the implicated database object(s). It should be noted that in a multi-tenant deployment, the gesture rules tables 118 may include a set of rules that are associated with or otherwise specific to an individual tenant or an individual user. In this regard, the same gesture may result in different database actions depending on user making the input gesture or the tenant associated with the user making the gesture.

Still referring to FIG. 1, in exemplary embodiments, the application server 102 and/or application platform 112 generates or otherwise provides a gesture recognition engine 120 that is incorporated with or otherwise integrated into the virtual applications to detect or otherwise identify the spatial characteristics of an input gesture with respect to an instance of the virtual application and the textual information or other subset of displayed content within the instance of the virtual application that is implicated by the input gesture. As described in greater detail below, the gesture recognition engine 120 accesses the gesture rules table 118 to identify or otherwise determine the database action to be performed based on the spatial characteristics of the gesture and the displayed content implicated by the gesture, and in response, automatically initiates or otherwise performs the identified action with respect to one or more database objects (or rows or entries) in one or more of the database object tables 116. Thereafter, the gesture recognition engine 120 may automatically update the content presented within the virtual application to reflect performance of the database action with respect to the implicated content, as described in greater detail below in the context of FIGS. 3-11. In the illustrated embodiment, the application server 102 and/or application platform 112 also generates or otherwise provides a text recognition engine 122 which is utilized by the gesture recognition engine 120 to recognize or otherwise resolve textual information implicated by an input gesture and utilize the resulting text to perform a database action, as described in greater detail below.

It should be understood that FIG. 1 is merely one simplified representation of a computing system provided for purposes of explanation and is not intended to limit the subject matter described herein. For example, in practical embodiments, an intermediary device (e.g., server 102) may not be present logically between a client device 106 and a database 104, where the gesture recognition and related processes described herein may be implemented or otherwise performed locally on the client device 106 configured to interact directly with the database 104 rather than via an intermediary device. In other words, various features and/or functionality of the server 102 may be implemented by or otherwise integrated into the client device 106. Additionally, although FIG. 1 depicts the client device 106 communicating on the same network 108 that the application server 102 and the database 104 communicate on, in practice, the client device 106 and the application server 102 may communicate via a communications network that is logically separate and/or distinct from the network 108. For example, the client device 106 could communicate with the application server 102 via a cellular network or the Internet, while the application server 102, and/or the database 104 communicate via a local area network (LAN) behind a firewall, or the like.

Figure 2:
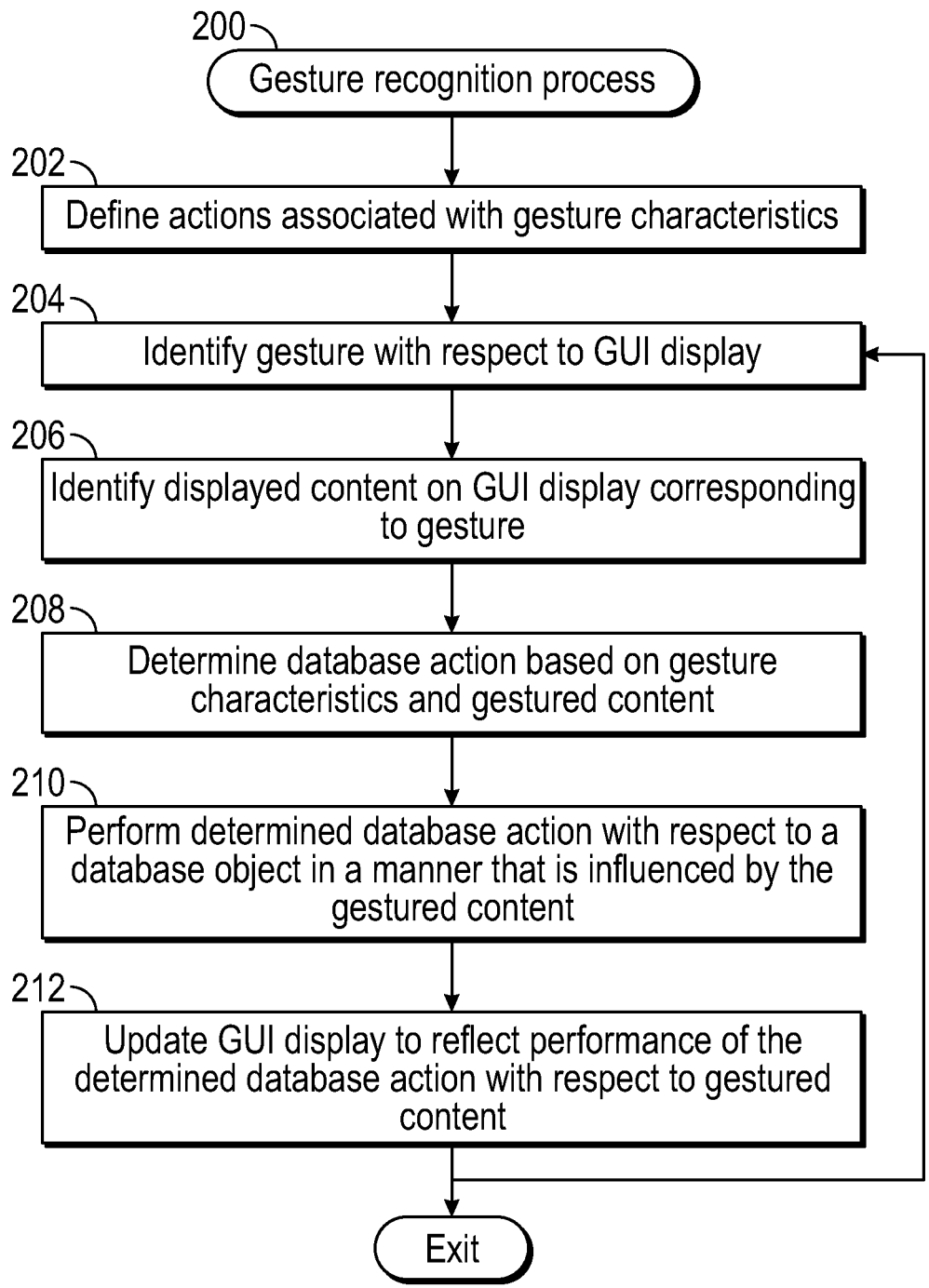
FIG. 2 is a flow diagram of an exemplary gesture recognition process suitable for use in the computing system of FIG. 1 in accordance with one or more embodiments.

FIG. 2 depicts an exemplary embodiment of a gesture recognition process 200 suitable for implementation in a computing system to perform database actions in response to user gestures in a manner that is influenced by the characteristics of the gesture and the displayed content associated with the gesture. For illustrative purposes, the following description may refer to elements mentioned above in connection with FIG. 1. In practice, portions of the gesture recognition process 200 may be performed by different elements of the computing system 100; however, for purposes of explanation, the subject matter is described herein primarily in the context of the gesture recognition process 200 being performed by the application server 102, the processing system 110, the application platform 112, the gesture recognition engine 120 and/or the text recognition engine 122. It should be appreciated that the gesture recognition process 200 may include any number of additional or alternative tasks, the tasks need not be performed in the illustrated order and/or the tasks may be performed concurrently, and/or the gesture recognition process 200 may be incorporated into a more comprehensive procedure or process having additional functionality not described in detail herein. Moreover, one or more of the tasks shown and described in the context of FIG. 2 could be omitted from a practical embodiment of the gesture recognition process 200 as long as the intended overall functionality remains intact.

The illustrated gesture recognition process 200 initializes or otherwise begins by defining associations between database actions, gesture characteristics, and the type and/or amount of displayed content associated with the gesture (task 202). In this regard, for a combination of geometric and directional characteristics that define a particular gesture, one or more database actions may be associated with that particular gesture, conditional upon the displayed content associated with the gesture. For example, a counterclockwise circle gesture may be associated with a query database action when the displayed content encompassed or overlapped by the circle does not include any existing database objects, but when the counterclockwise circle encompasses or overlaps one or more existing database objects, a database action to establish a particular association or relationship for those one or more existing database objects relative to other database objects may be assigned to the gesture.

For purposes of explanation, the displayed content associated with the gesture may alternatively be referred to herein as the gestured content, which should be understood as referring to the portion of content displayed on a client device 106 that is encompassed, overlapped, collocated with, or otherwise indicated by a particular gesture. In this regard, for enclosing gestures, such as a circle, square, polygon, or other closed shape, the gestured content may generally be understood as the portion of the content displayed on a display device associated with the client device 106 that is surrounded, encompassed, overlapped, captured, or otherwise contained within the gesture. Conversely, for linear or open gestures, the gestured content may generally be understood as the portion of the content displayed on or by the client device 106 where the gesture emanates from, terminates on, or is otherwise directed to/from. That said, the subject matter described herein is not limited to any particular criteria, rules, or manner for determining which displayed content should be associated with a particular gesture. For example, a line of text or a portion thereof may be associated with a linear gesture overlapping or through that line of text.

In exemplary embodiments described herein, the database action performed responsive to a particular gesture is conditioned upon the gestured content. For example, gestured content that includes, invokes, or otherwise implicates one or more existing database object(s) maintained in the object table(s) 116 may result in a different database action being performed for a particular combination of geometric and directional gesture characteristics than would otherwise be performed if the gestured content did not include or reference an existing database object. Accordingly, an entry in the gesture rules table 118 maintains, for a particular gesture, indicia of the one or more database actions associated with that gesture and the gestured content criteria associated with the respective database action(s).

In one embodiment, the processing system 110 and/or the application platform 112 may generate or otherwise provide one or more GUI displays on the client device 106 configured to allow a user of the client device 106 to input or otherwise provide a gesture for which one or more database actions should be assigned while also including GUI elements adapted to allow the user to define the type of database action(s), the number and/or type of database object(s), and other criteria dictating when a particular type of database action should be performed for that gesture. Thereafter, the processing system 110 and/or the application platform 112 may update the gesture rules table 118 to include or otherwise maintain an entry associated with that input gesture that maintains the desired associations between the input gesture (or its gestural characteristics), its assigned database actions, and the gestured content criteria dictating when an assigned database action should be performed based on the gestured content.

Still referring to FIG. 2, after the rules or criteria defining the associations between input gestures, gestured content, and the corresponding database actions have been defined, the gesture recognition process 200 continues by detecting or otherwise identifying an input gesture on or associated with a GUI display on a client device and identifying or otherwise determining the portion of displayed content associated with the gesture (tasks 204, 206). In this regard, when the user of the client device 106 manipulates a user input device to perform a gesture on or overlying the GUI display associated with the virtual application presented by or on the client device 106, the gesture recognition engine 120 is configured to detect or otherwise identify the characteristics associated with the gesture (e.g., location within the GUI display, geometric characteristics of the gesture, directional characteristics of the gesture, and the like). In one or more embodiments, the virtual application is configured to dynamically update the GUI display to provide a graphical representation of the gesture or other graphical indicia of the gesture concurrently to and/or contemporaneous with the user making the gesture to provide visual feedback to the user regarding the displayed content that is likely to be implicated, invoked, or otherwise indicated by the gesture.

Based on the spatial characteristics of the gesture (e.g., the location, dimensions, shape, and the like) and the directional characteristics of the gesture, the gesture recognition engine 120 identifies or otherwise determines the corresponding content that is presented on the GUI display at locations corresponding to or otherwise indicated by the gesture. For example, in the case of textual information, the gesture recognition engine 120 may identify the characters or words that are, either in whole or in part, encompassed or overlapped by or otherwise collocated with at least a portion of the input gesture. In this regard, the gestured content may include any alphanumeric characters on the GUI display that are overlapped, surrounded, or encompassed by the input gesture or portions thereof. Additionally, the gestured content may include additional characters for words partially overlapped by the input gesture, and in the case of a linear or open ended gesture, any additional characters or words that the input gesture is directed towards or emanates from, that is, characters or words within a threshold distance on the GUI display from a termination point (or endpoint) of the input gesture.

The gesture recognition process 200 continues by identifying or otherwise determining the database action to be performed based on the gesture characteristics and the displayed content associated with the input gesture (task 208). In exemplary embodiments, the gesture recognition engine 120 accesses the gesture rules table 118 in the database 104 to retrieve or otherwise identify the appropriate gestured content criteria and assigned database action(s) for the input gesture. For example, the gesture recognition engine 120 may query the gesture rules table 118 using one or more identifiers associated with a user of the client device 106 (e.g., a user identifier and/or a tenant identifier) and one or more characteristics indicative of the input gesture to retrieve or otherwise obtain the gestured content criteria to be applied to the gestured content in order to determine the assigned database action to be performed.

When the gestured content includes text, the gesture recognition engine 120 and/or the text recognition engine 122 may parse or otherwise analyze the gestured text implicated by the input gesture to identify or otherwise determine whether the gestured text includes or otherwise invokes one or more existing database objects, and if so, identifying the number and type(s) of database object(s) invoked. In this regard, if the gestured text includes a hyperlink or other reference to a database object, the gesture recognition engine 120 and/or the text recognition engine 122 may inspect that element to identify or otherwise determine the object type and potentially other attributes of that database object. Based on the identified database object(s) contained within the gestured text, the gesture recognition engine 120 identifies the database action to be performed as the database action associated with the gestured content criteria that match or otherwise correspond to the identified database object(s). In the absence of an existing database object within the gestured content, the gesture recognition engine 120 identifies the database action to be performed as the assigned database action for that input gesture when the gestured content that does not include any existing database object(s).

In one or more exemplary embodiments, when the gestured content does not include or otherwise invoke one or more existing database objects, the gesture recognition engine 120 and/or the text recognition engine 122 analyzes the gestured content to determine the database action be performed. For example, the input gesture may be assigned with a database action to create a new database object without specifying the type of database object to be created. Accordingly, the gesture recognition engine 120 and/or the text recognition engine 122 may analyze the gestured content to determine the type of database object to be created based on the content.

For example, when the gestured content consists of text, the text recognition engine 122 may analyze the contents of the text to identify the specific type of database object to be created based on what type of object the gestured text is most likely referring to. For an input gesture assigned with an object creation database action, the gesture recognition engine 120 may determine a new contact database object should be created when the text recognition engine 122 determines gestured text includes the name of a person. Conversely, the gesture recognition engine 120 may determine a new activity database object should be created when the text recognition engine 122 determines gestured text includes one or more verbs indicative of a task or activity based on the surrounding context. In a similar manner, for an input gesture assigned with a querying database action, the gesture recognition engine 120 may determine the object table 116 or object type to query the database 104 for based on the contents of the gestured text. It should be appreciated that the examples described above represent a select few exemplary implementations, and the subject matter described herein is not intended to be limited to any particular manner or scheme for correlating input gestures to corresponding database actions based on the context of the gestured content.

Still referring to FIG. 2, after determining the database action to be performed, the gesture recognition process 200 continues by initiating or otherwise performing the database action with respect to one or more database objects in the database (task 210). As described above, the determined database action is performed in a manner that is influenced by the gestured content. For example, for an object creation database action, the processing system 110 and/or application platform 112 initiates creation of a new entry or row corresponding to a new database object of an identified object type in the database object table 116 associated with that identified database object type, with one or more columns or fields of that entry including a portion of the gestured content or being otherwise influenced by the gestured content, resulting in a new database object that corresponds to the gestured content. In one or more embodiments, initiation creation of a new database object may trigger an object creation wizard and a corresponding sequence of one or more GUI displays generated by the virtual application to define, modify, or otherwise configure one or more fields of the new object, thereby enabling the user to define additional attributes, parameters, or other characteristics or values to be associated with the new object that were not included in the gestured content.

For a querying database action, the processing system 110 and/or application platform 112 generates or otherwise provides a query to the database 104 configured to return data or information associated with an existing entry or row in a database object table 116 that includes one or more fields or columns that match or otherwise correspond to at least a portion of the gestured content. In one or more embodiments, a query statement may be generated to query (or search) only a particular database object table 116 associated with a particular database object type using the gestured content as the search criteria for querying or searching that object table 116. Depending on the embodiment, the particular database object type to be queried for may be determined based on the gestural characteristics of the input gesture or alternatively based on the contents of the gestured content. For example, when the gestured content includes text that is likely to represent the name of a person, the processing system 110 and/or application platform 112 queries the contact database object table 116 in the database 104 for an entry having a name field that matches the name identified within the gestured text and permissions fields that match or otherwise correspond to the user of the client device 106.

For database actions invoking or implicating one or more existing database object(s), the processing system 110 and/or application platform 112 interact with the object tables 116 in the database 104 to modify one or more fields of the existing database object(s) to effectuate the database action. In this regard, the rules associated with a particular input gesture may be configured to establish a particular type of relationship or association between two different database objects, where the processing system 110 and/or application platform 112 automatically updates the appropriate fields or columns of the entries in the object table(s) 116 associated with those database objects to reflect the desired relationship between the database objects. For example, an input gesture with gestured content that includes an existing account database object and an existing contact database object may be configured to assign that existing contact as a lead for that account, where the processing system 110 and/or application platform 112 automatically updates a lead association field of that contact's entry in the contact object table 116 to identify that account's entry in the account object table 116, and similarly updates a lead association field of that account's entry in the account object table 116 to identify that contact's entry in the contact object table 116, thereby establishing the desired relationship between the existing contact and the existing account.

After performing the identified database action, the gesture recognition process 200 updates the GUI display to reflect performance of the database action with respect to the gestured content (task 212). For example, in an exemplary embodiment where a graphical representation of the input gesture is provided on the GUI display on the client device 106, in response to performing the database action, the processing system 110 and/or application platform 112 automatically updates the GUI display associated with the virtual application to remove the graphical representation of the input gesture. In exemplary embodiments, the processing system 110 and/or application platform 112 also automatically updates or modifies at least a portion of the gestured content to indicate the portion of the gestured content that the database action was performed with respect to. Depending on the embodiment, one or more graphical characteristics of the gestured content may be modified in a manner that indicates the performed database action, or a portion of the gestured content may be modified or replaced with a reference to the database object that was acted on, such as, for example, a hyperlink, button, or other GUI element that may be activated by the user to view or access the database object. For example, when the gestured content includes text, one or more graphical characteristics of the text (e.g., color, font type or size, or other style or visual effects) may be modified to indicate performance of a database action that utilized that modified portion of text, or text may be replaced with a hyperlink or other reference to a database object that corresponds to that portion of text.

After updating the GUI display to reflect performance of the database action, the loop defined by tasks 204, 206, 208, 210 and 212 may repeat throughout presentation of a virtual application on the client device 106 to support continually correlating input gestures with corresponding database actions based on the context of those input gestures, as described above. In some embodiments, the gesture recognition process 200 updates the GUI display to include a GUI element that may be activated or selected by a user to undo the performed database action. For example, a button may be selected by the user to delete a newly created database object from a database object table 116, or to reset the object association fields of one or more database objects in the database object table(s) 116.

FIGS. 3-11 depict an exemplary sequence of GUI displays that may be presented on a client device 106 (e.g., by or within a client application 114) in conjunction with the gesture recognition process 200 of FIG. 2. In this regard, in one or more embodiments, the GUI displays are presented in connection with an instance of a virtual application in a database system, as described above in the context of FIG. 1 and in greater detail below in the context of FIG. 12.

Figure 3:
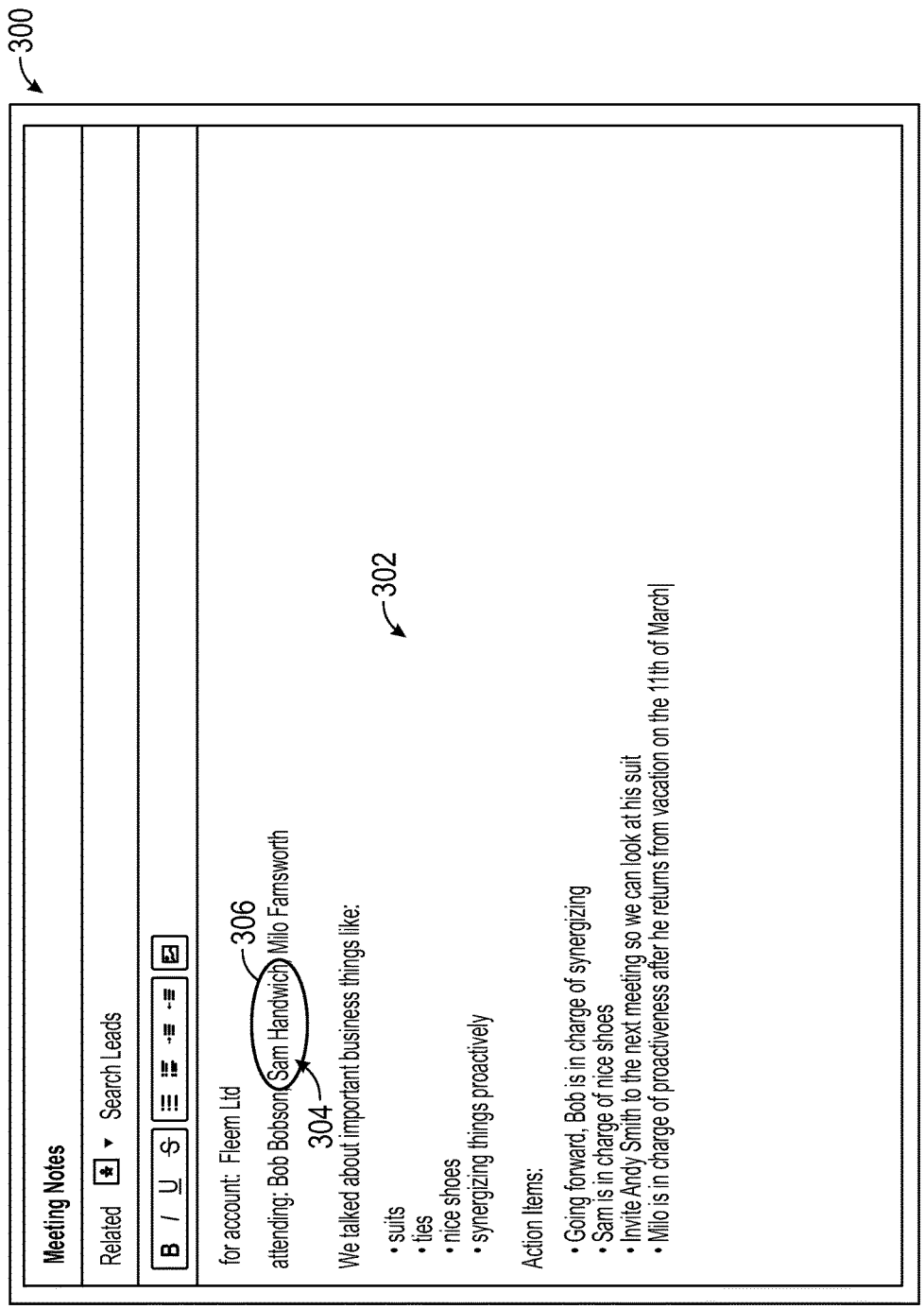

FIG. 3 depicts an initial GUI display 300 that includes textual information 302 that may be input or otherwise provided to an application on a client device 106 via an input device, such as a keyboard, an audio input device with speech recognition system, or the like, and subsequently displayed on a display device associated with the client device 106. Thereafter, to incorporate or otherwise integrate a portion 304 of the plain text information 302 displayed in the GUI display 300, the user manipulates an input device of the client device 106, such as a touchscreen, touch panel, computer mouse, or the like, to make a gesture at a corresponding location on the GUI display 300 that indicates that portion 304 of the displayed text 302. For example, in the illustrated embodiment, the user makes a clockwise circular gesture that encompasses the text "Sam Handwich" on the GUI display 300. In response, the GUI display 300 may automatically be updated to include a graphical representation 306 of the input gesture on the GUI display 300 encompassing the gestured portion 304 of the displayed text 302.

FIG. 4 depicts an updated GUI display 400 that indicates performance of a database action with respect to the gestured text 304 by modifying or otherwise replacing the gestured text 304 with a selectable GUI element 402, such as a hyperlink, a button, or the like, that references the database object the database action was performed upon. The illustrated selectable graphical representation 402 of the gestured text 404 includes a graphical indicia of the object type associated with the referenced database object, such as an object type icon 404. Additionally, the updated GUI display 400 includes a selectable GUI element 406, such as a button (which may be integrated with the GUI element 402), that allows the user to undo the performed database action. The graphical representation of the input gesture 306 is also removed from the GUI display 400, thereby indicating completion of the database action in conjunction with the selectable GUI element 402.

Still referring to FIGS. 3-4, the database action performed on the gestured text 304 may vary depending upon the gestured content criteria and other gesture rules associated with the user maintained in the gesture rules tables 118, as described above in the context of FIGS. 1-2. For example, in one embodiment, the database action of creating a contact database object may be assigned to a clockwise circular input gesture, whereby in response to identifying the clockwise circular input gesture 306, the gesture recognition engine 120 automatically initiates creation of a new contact database object in the database 104. In this regard, the gesture recognition engine 120 may provide the gestured text 304 to the text recognition engine 122, which, in turn, parses or otherwise analyzes the gestured text 304 to identify text that is likely to be the name of an individual within the gestured text 304. Using the recognized name ("Sam Handwich") from within the gestured text 304, the gesture recognition engine 120 initiates creation of a new contact database object in the contact database object table 116 having value for a name field equal to the recognized name. Thereafter, the GUI display 300 is updated to include a selectable contact icon 402 that includes a graphical indicia 404 of the contact object type and the recognized name from the gestured text 304.

In another embodiment, the generic database action of creating a database object may be assigned to a clockwise circular input gesture, whereby in response to identifying the clockwise circular input gesture 306, the gestured text 304 is analyzed to identify the type of database object to be created. In this regard, the gesture recognition engine 120 may provide the gestured text 304 to the text recognition engine 122, which, in turn, parses or otherwise analyzes the gestured text 304 to identify text that is likely to indicate a particular type of database object supported by the database object tables 116. In such embodiments, in response to recognizing text that is likely to be the name of an individual within the gestured text 304, the gesture recognition engine 120 automatically initiates creation of a new contact database object in the contact database object table 116 having value for a name field equal to the recognized name, resulting in the updated GUI display 400.

In another embodiment, the database action of querying for a database object may be assigned to a clockwise circular input gesture. When the clockwise circular input gesture is assigned with querying for a contact database object, the text recognition engine 122 parses or otherwise analyzes the gestured text 304 to identify text that is likely to be the name of an individual within the gestured text 304, and provides the recognized name to the gesture recognition engine 120, which, in turn, queries the contact database object table 116 in the database 104 for an entry having a name field equal to the recognized name within the gestured text 304 (e.g., "Sam Handwich") along with permissions fields that indicate the user of the client device 106 is authorized to view or access the returned contact database object. In this regard, the gesture recognition process 200 identifies an existing database object of the desired object type indicated by the input gesture rather than identifying a similarly named database object of a different object type. In a similar manner as described above, when the generic database action of querying for a database object is assigned to a clockwise circular input gesture, the text recognition engine 122 analyzes the gestured text 304 to identify text that is indicative of a particular type of database object to be queried for, and provides indication of that database object type along with the recognized text corresponding thereto to the gesture recognition engine 120 for querying as described above. In response to the query returning an entry in the contact object table 116 having a name field matching the gestured text 304 and permissions fields indicating the user of the client device 106 can view or access that contact object, the GUI display 300 is updated to include a selectable contact icon 402 that references the entry corresponding to matched contact database object, resulting in the updated GUI display 400.

Figure 5:
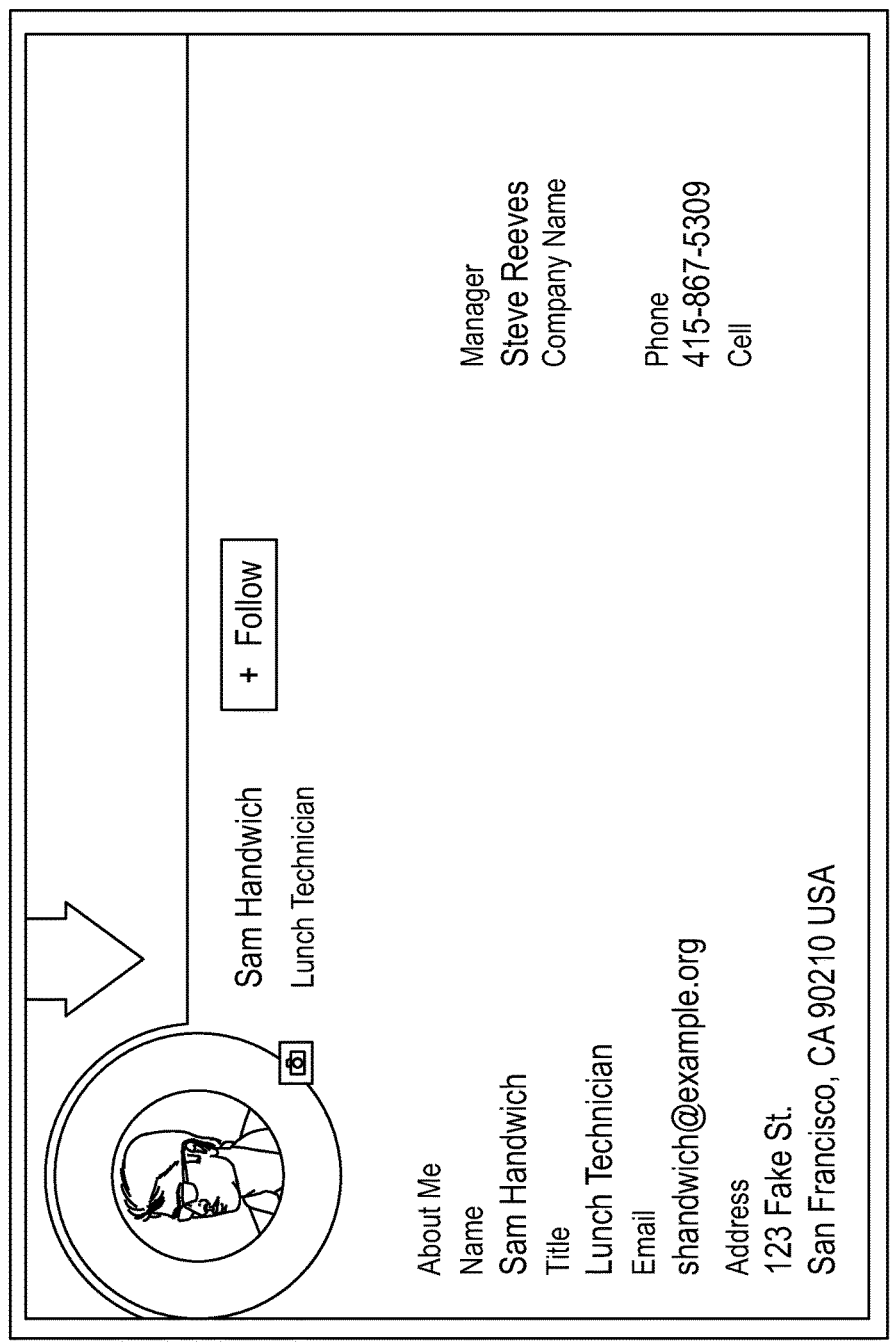

Referring to FIG. 5, in response to the user selecting the selectable GUI element 402 corresponding to the gestured text 304, a database object GUI display 500 may be presented by a virtual application on the client device 106. For example, with reference to FIGS. 3-4, in response to the user selecting the selectable contact database object element 402, the processing system 110 and/or the application platform 112 utilizes the reference to the contact database object table 116 to query that entry in the contact database object table 116 to obtain fields of that contact database object, which, in turn, are utilized to generate a contact GUI display 500 overlying or in lieu of the GUI display 402. In this regard, after creating a new contact object or locating an existing contact object in response to the input gesture 306, selection of the contact GUI element 402 corresponding to the gestured text 304 allows the user to view the fields or attributes of the corresponding "Sam Handwich" contact database object and review or modify those fields or attributes of the contact database object as desired.

Figure 6:
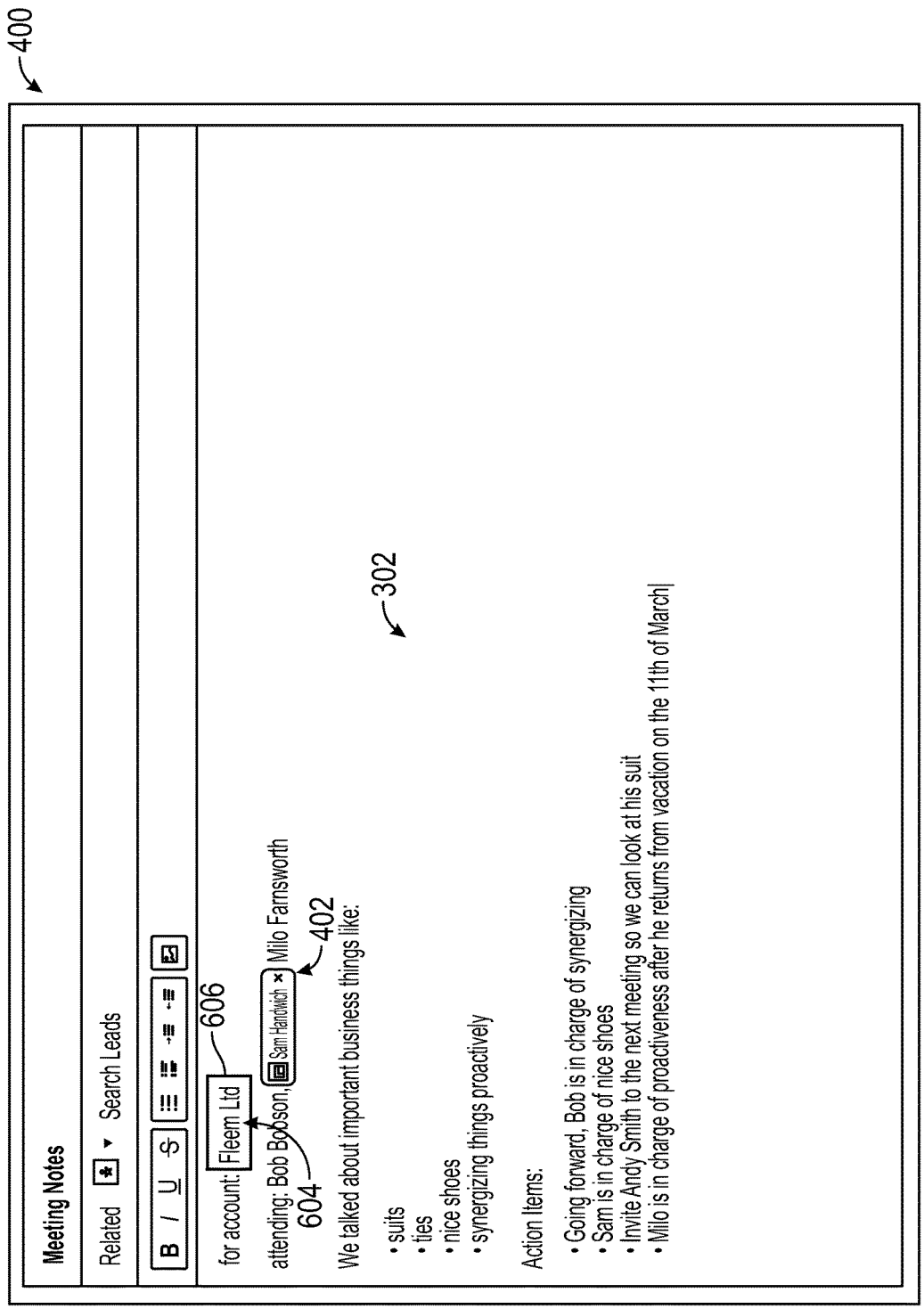
Figure 7:
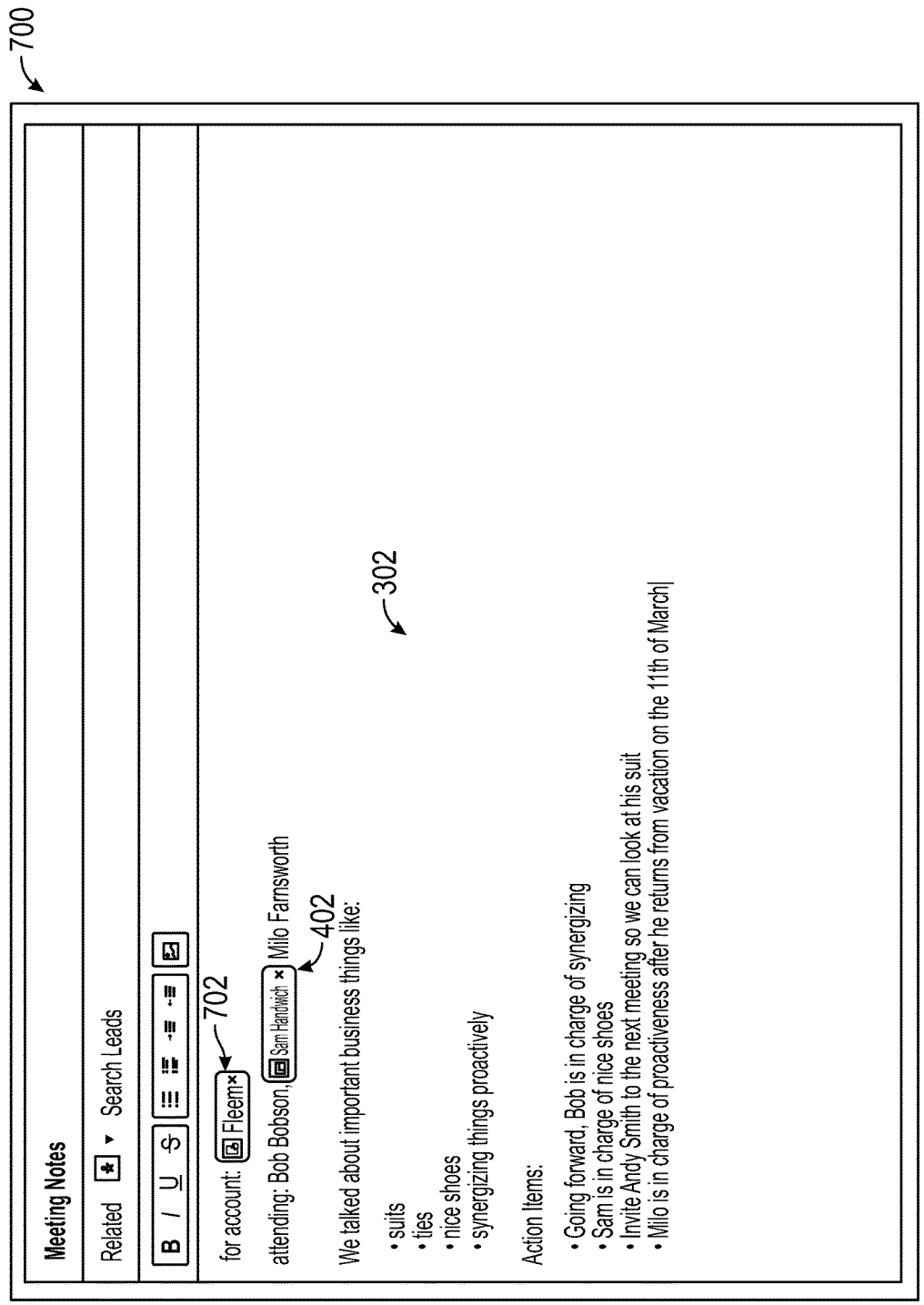

Referring to FIGS. 6-7, after the initial gesture 306, the loop defined by tasks 204, 206, 208, 210 and 212 may repeat to allow the user to make additional gestures with respect to the displayed text 302. For example, in the illustrated embodiment, the user makes a clockwise rectangular gesture 606 that encompasses the text "Fleem Ltd" on the GUI display 400. In a similar manner as described above, after performing a database action with respect to the gestured text 604, an updated GUI display 700 including a selectable GUI element 702 referencing a database object in lieu of the gestured plain text 604, with the graphical representation of the rectangular input gesture 606 being removed.

As described above, the database action performed on the gestured text 604 may vary depending upon the gestured content criteria and other gesture rules associated with the user maintained in the gesture rules tables 118. For example, in one embodiment, the database action of creating an account database object may be assigned to a clockwise rectangular input gesture, whereby in response to the clockwise rectangular input gesture 606, the gesture recognition engine 120 automatically initiates creation of a new account database object for "Fleem Ltd" in the database 104 and updates the GUI display 400 to include a reference 702 that new account database object. In another embodiment, the database action of querying for an account database object may be assigned to a clockwise rectangular input gesture, whereby in response to the clockwise rectangular input gesture 606, the gesture recognition engine 120 automatically initiates querying of the account database object table 116 for an existing account database object with a name field of "Fleem Ltd" and updates the GUI display 400 to include a reference 702 that existing account database object.

In a similar manner as described above, when the assigned database action is generic or not specific with respect to the object type involved with the database action, the text recognition engine 122 parses or otherwise analyzes the gestured text 604 to identify text indicative of a particular type of database object supported by the database object tables 116. Additionally, in some embodiments, the text recognition engine 122 may also analyze preceding or succeeding text coming before or after the gestured text 604 (i.e., the context of the gestured text 604) to identify the database object type to be implicated or invoked by the database action (e.g., "for account Fleem Ltd").

Figure 8:
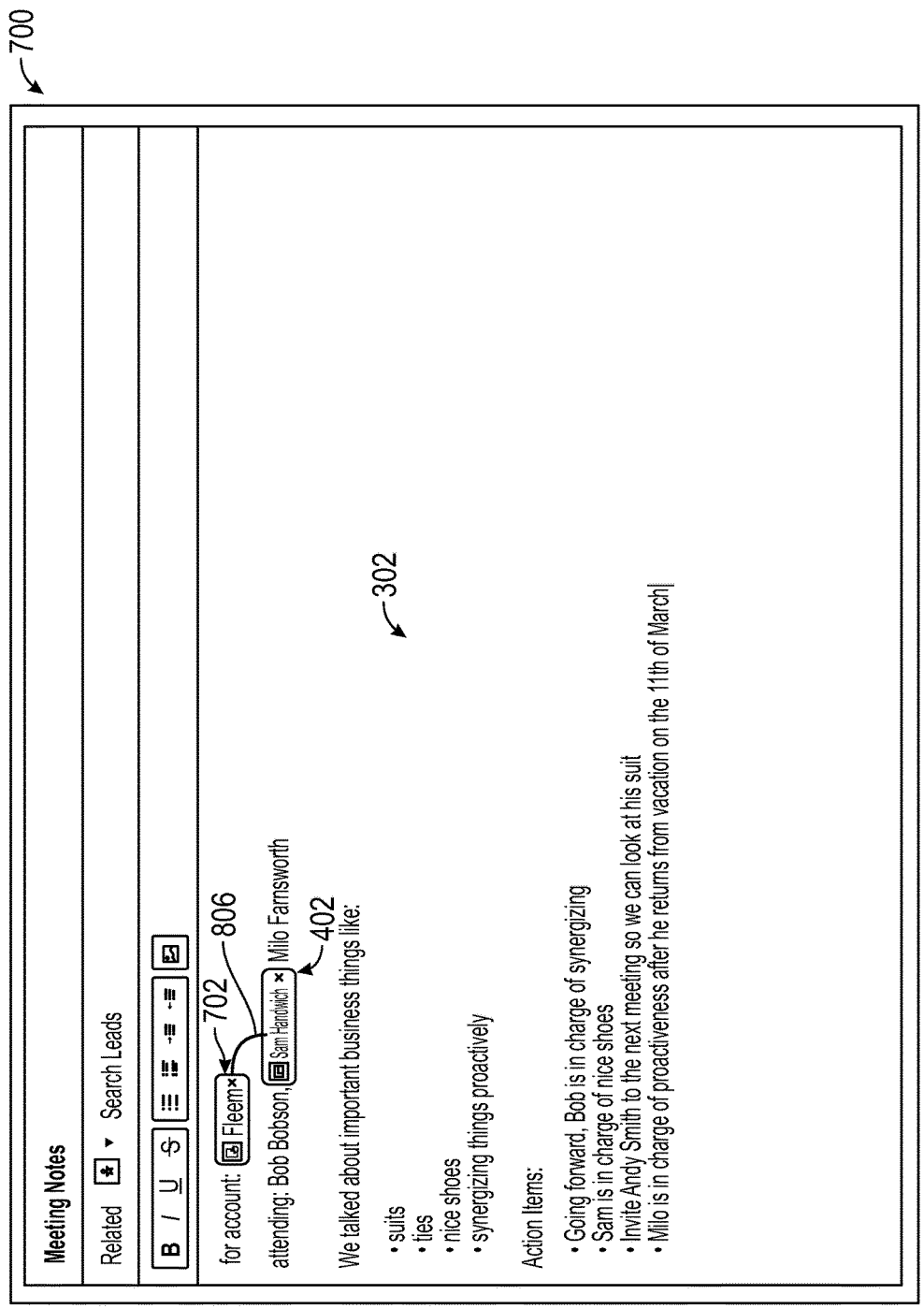

FIG. 8 depicts an exemplary input gesture 806 for establishing an association between existing database objects. For example, the user may manipulate an input device to make a linear gesture 806 between the displayed objects 402, 702 to cause the processing system 110 and/or application platform 112 to establish an association between the displayed objects 402, 702 in the database 104. In this regard, the type of association to be created in response to a linear gesture may depend on the directionality or temporal nature of the input gesture as well as the type of database objects referenced by the input gesture. For example, the displayed object at the location corresponding to the starting location of the linear gesture may be assigned a child or subsidiary relationship with respect to the displayed object at the location corresponding to the ending location of the linear gesture, or vice versa. In this regard, a linear input gesture 806 that initializes on or overlying a displayed contact database object 402 and terminates on or overlying a displayed account database object 702 may result in the contact database object 402 being associated with the account database object 702 as a sales representative or a lower level employee associated with that account. Conversely, a linear input gesture 806 that initializes on or overlying a displayed account database object 702 and terminates on or overlying a displayed contact database object 402 may result in the contact database object 402 being associated with the account database object 702 as a lead or a higher level employee associated with that account. It will be appreciated that there are numerous different types of gestured content criteria and gestural characteristics that may be assigned with different relational actions to be performed, and the subject matter described herein is not limited to any particular embodiment for establishing associations between existing database objects based on input gestures.

In one or more embodiments, establishing an association between existing database objects may result in one or more of the displayed database objects 402, 702 being updated or otherwise modified to reflect the association. For example, the color of the object type icon 404 associated with a contact database object 402 may be changed or modified in response to establishing an association with an account database object to indicate the type of relationship that the contact database object 402 has with respect to the account database object or other database objects (e.g., to facilitate distinguishing between different contact objects based on their associations or lack thereof with other non-contact objects).

Figure 9:
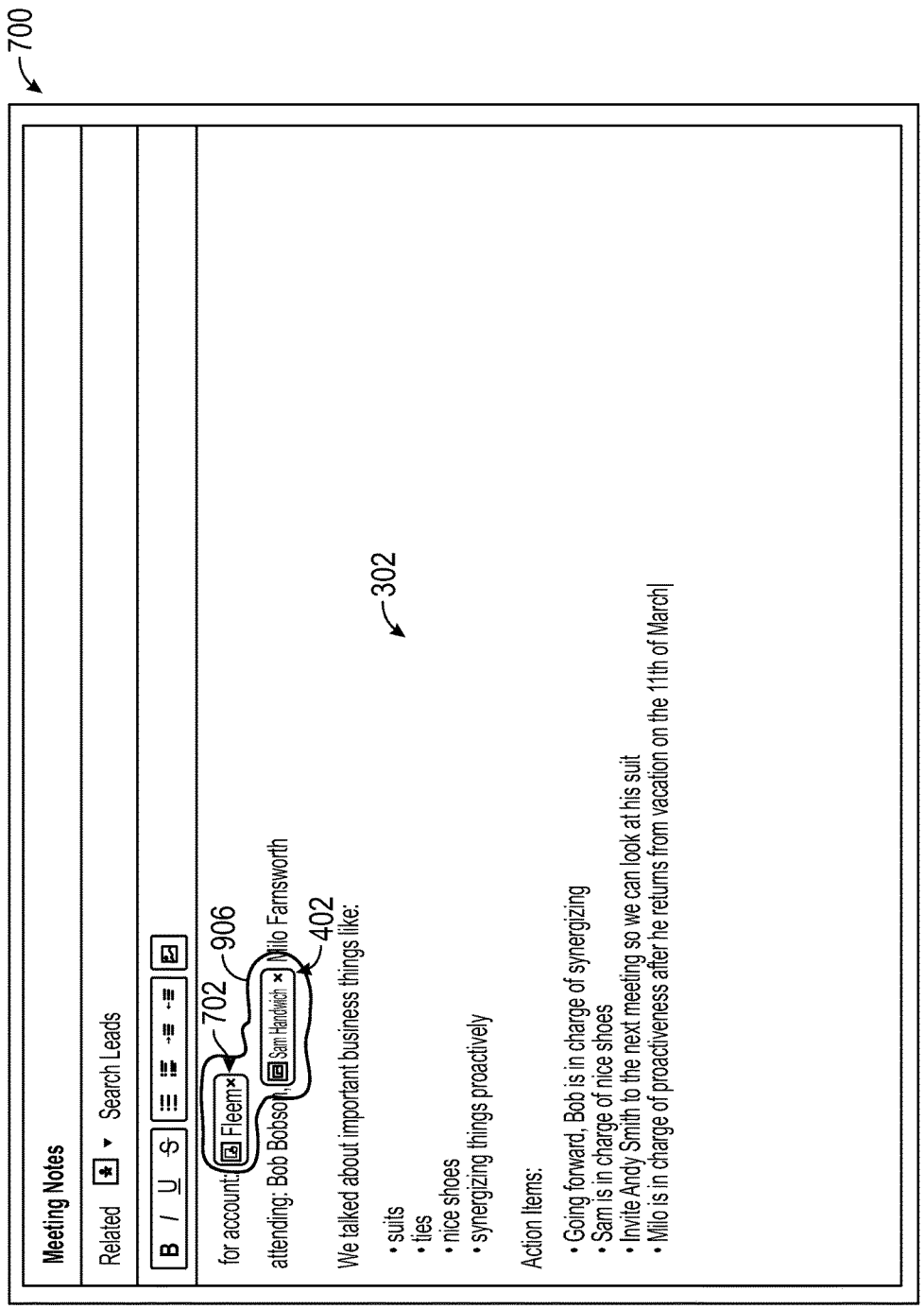

FIG. 9 depicts another exemplary input gesture 906 for establishing an association between existing database objects. For example, the user may manipulate an input device to make a circular gesture 906 encompassing displayed objects 402, 702 to cause the processing system 110 and/or application platform 112 to establish an association between the displayed objects 402, 702 in the database 104. Again, the type of association to be created in response to a linear gesture may depend on the directionality of the input gesture 906 as well as the type of database objects referenced by the input gesture. For example, a clockwise circular gesture may be assigned with creating a child or subsidiary relationship between objects, while a counterclockwise circular gesture may be assigned with creating a parent or supervisory relationship between objects.

In one or more embodiments, a relational input gesture may be utilized to identify a type of database object to be created in connection with establishing a relationship or association with a displayed database object. In this regard, an input gesture assigned with associating a contact database object as a lead of an account database object may be utilized to create a new contact database object or a new account database object when the gestured text includes only one existing database object (e.g., the other of a contact or account database object). Accordingly, as described above, the text recognition engine 122 may parse or otherwise analyze the gestured text 304 to identify text that is likely to correspond to the missing database object type associated with the associative input gesture. For example, referring again to FIG. 4, a linear input gesture assigned with associating a contact database object as a lead of an account database object may be made between the existing "Sam Handwich" contact database object 402 displayed on the GUI display 400 and the "Fleem Ltd" plain text, whereby in response to the gesture recognition engine 120 identifying the input gesture as being assigned with associating a contact database object as a lead of an account database object, the gesture recognition engine 120 and/or the text recognition engine 122 analyzes the gestured text ("Fleem Ltd") to identify the name of the new account database object to be created and then associated with the "Sam Handwich" contact database object 402 in the database 104.

Figure 10:
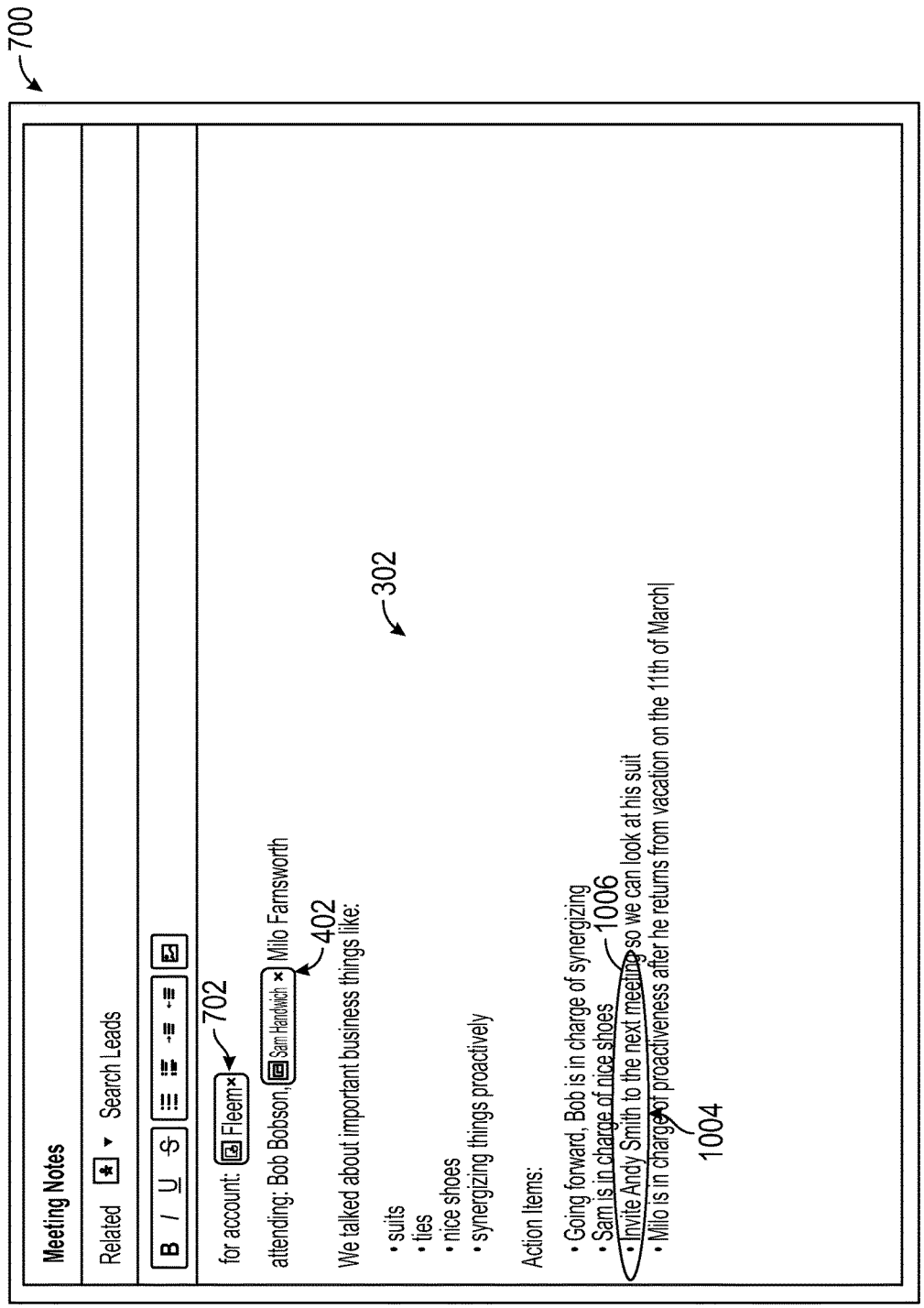
Figure 11:
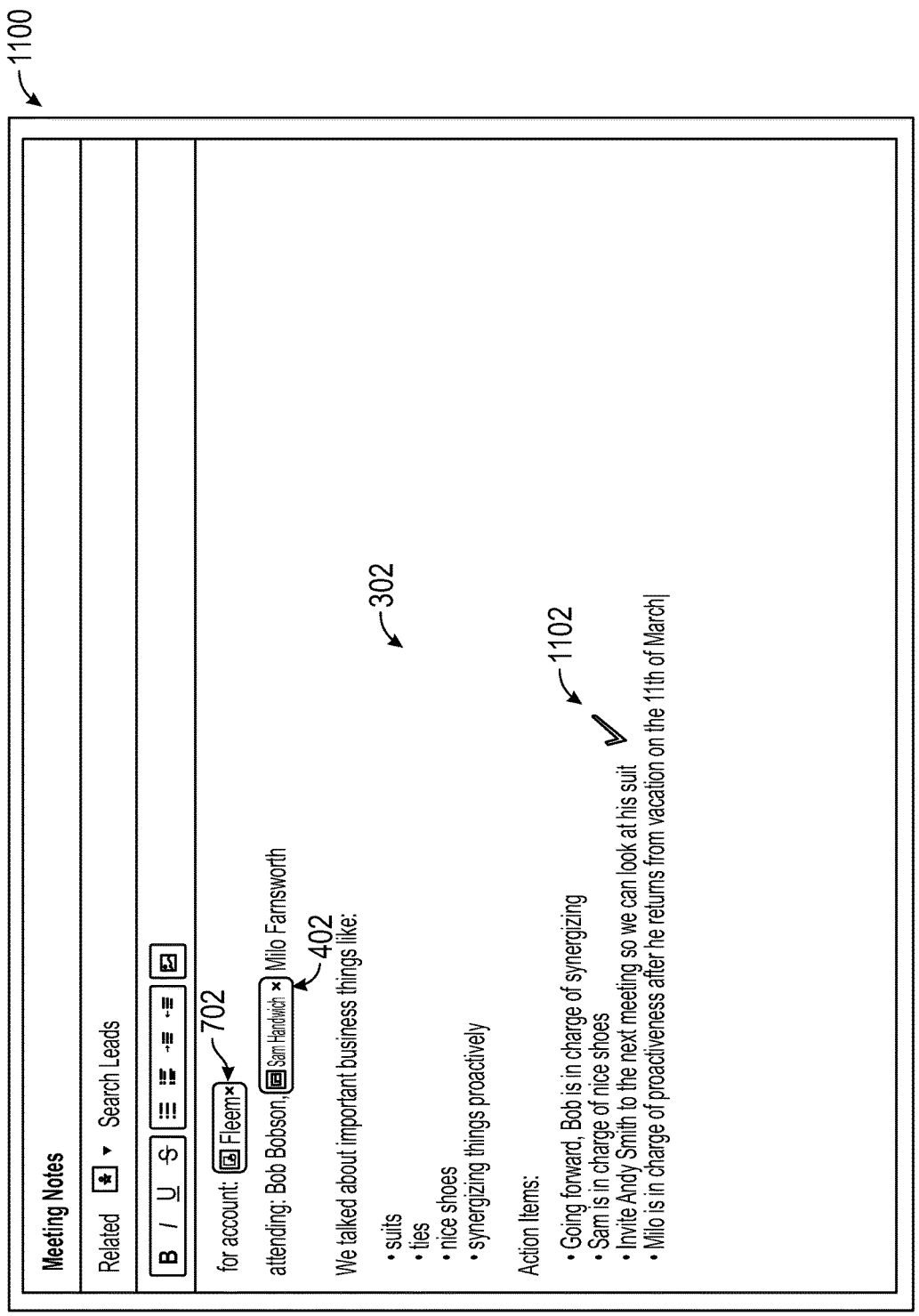

FIGS. 10-11 depict another GUI sequence illustrating creation of a new activity database object in the activity database object table 116. In this example, the user manipulates an input device of the client device 106 to make a circular input gesture 1006, which is assigned with creating a new database object, around a portion 1004 of the displayed text 302 that includes a plurality of words. In response, the gesture recognition engine 120 provides the gestured text 1004 to the text recognition engine 122, which analyzes the gestured text 1004 to determine the type of database object to be created. In this example, in response to the text recognition engine 122 recognizing a verb within the gestured text 1004 indicative of an activity object, the text recognition engine 122 provides indication of the activity object type to the gesture recognition engine 120. Additionally, after identifying the activity object, the text recognition engine 122 may also analyze the gestured text 1004 to identify values for one or more additional fields of the activity object, such as, for example, the name "Andy Smith" as an invitee field for the activity object.

In response, the gesture recognition engine 120 initiates creation of a new activity database object in an activity object table 116 that includes an invitee field having a value equal to "Andy Smith" and provides corresponding indication of the created activity object 1102 on the updated GUI display 1100 to indicate performance of the database action in conjunction with removal of the graphical indicia of the input gesture 1006. As described above, the graphical indicia 1102 of the new activity object may be selectable by the user to view or modify the attributes, parameters, or fields of the activity object as desired. Additionally, in some embodiments, the gesture recognition engine 120 may utilize the additional fields of the activity database object to query the database 104 for an existing "Andy Smith" contact database object to be associated with the activity database object and/or create a new "Andy Smith" contact database object to be associated with the activity database object, in a similar manner as described above in the context of FIGS. 8-9. Thereafter, the GUI display 1100 may be further updated to include a selectable GUI element corresponding to the "Andy Smith" contact database object, as described above in the context of FIG. 4.

It will be appreciated that by virtue of the subject matter described herein, a user may quickly and intuitively perform database actions, such as creating database objects, querying database objects, associating database actions, and the like, by simply using input gestures associated with the displayed content the user would like such actions performed with respect to, rather than having to resort to more complicated or time consuming sequences of input actions. Again, it should be noted that FIGS. 3-11 depict merely one exemplary sequence of GUI displays, and numerous potential variations or sequences exist. Accordingly, the subject matter should not be construed to be limited to any particular example described above in the context of FIGS. 3-11.

Figure 12:
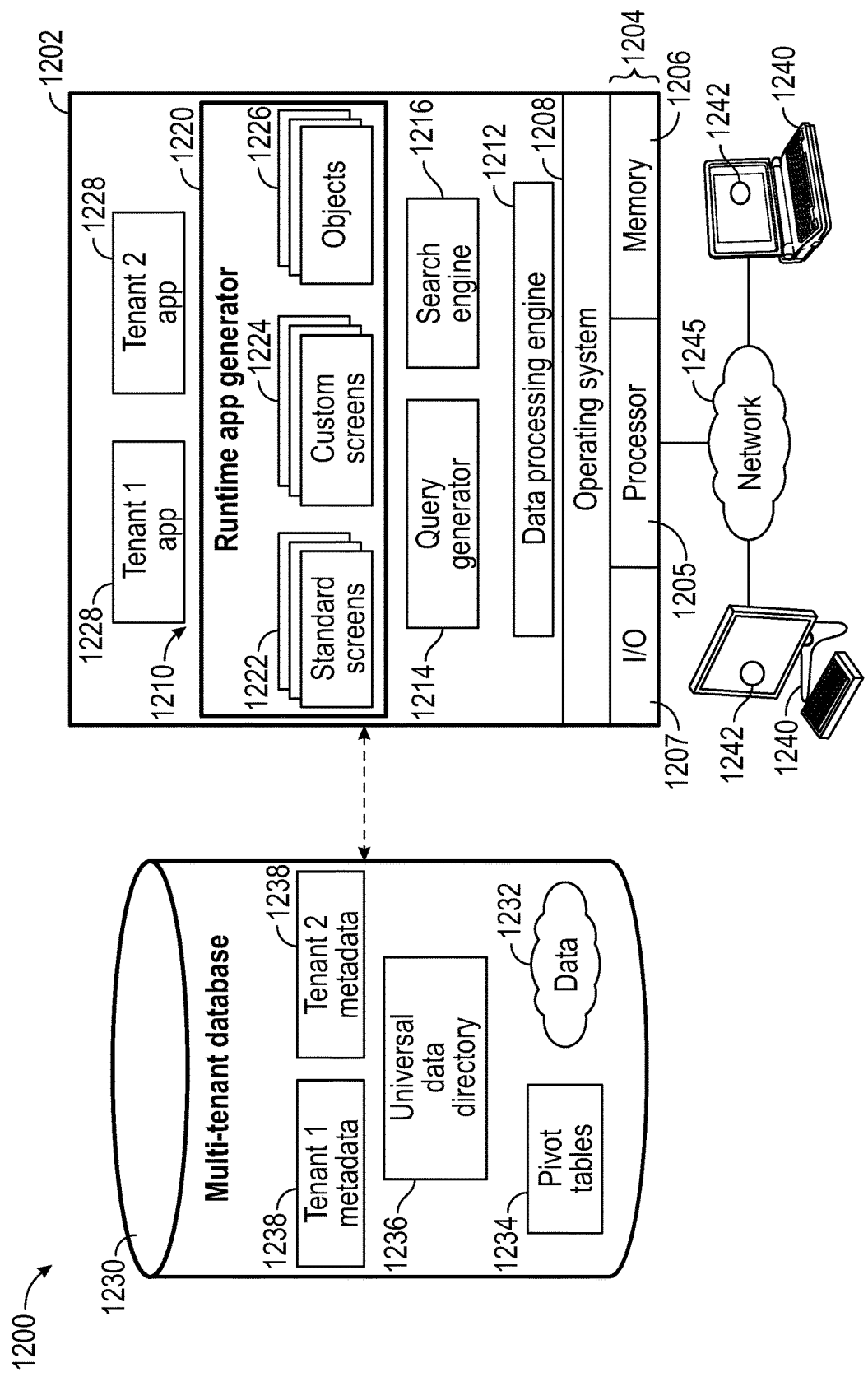
FIG. 12 is a block diagram of an exemplary multi-tenant system suitable for use with the gesture recognition process of FIG. 2 in accordance with one or more embodiments.

FIG. 12 depicts an exemplary embodiment of an on-demand multi-tenant database system 1200 suitable for use with the gesture recognition process 200 of FIG. 2 in the computing system 100 of FIG. 1. The illustrated multi-tenant system 1200 of FIG. 12 includes a server 1202 (e.g., server 102) that dynamically creates and supports virtual applications 1228 based upon data 1232 from a common database 1230 (e.g., database 104) that is shared between multiple tenants, alternatively referred to herein as a multi-tenant database. In this regard, the gesture recognition process 200 may be performed to perform database actions on database objects associated with an instance of a virtual application 1228 generated by the server 1202 (e.g., server 102) based upon data 1232 from database 1230 (e.g., database 104). Data and services generated by the virtual applications 1228 are provided via a network 1245 (e.g., network 108) to any number of client devices 1240 (e.g., client device 106, or the like), as desired. Each virtual application 1228 is suitably generated at run-time (or on-demand) using a common application platform 1210 that securely provides access to the data 1232 in the database 1230 for each of the various tenants subscribing to the multi-tenant system 1200. In accordance with one non-limiting example, the multi-tenant system 1200 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 1230. In this regard, each tenant includes one or more users associated with, assigned to, or otherwise belonging to that respective tenant. To put it another way, each respective user within the multi-tenant system 1200 is associated with, assigned to, or otherwise belongs to a particular tenant of the plurality of tenants supported by the multi-tenant system 1200. Tenants may represent customers, customer departments, business or legal organizations, and/or any other entities that maintain data for particular sets of users within the multi-tenant system 1200 (i.e., in the multi-tenant database 1230). For example, the application server 1202 may be associated with one or more tenants supported by the multi-tenant system 1200. Although multiple tenants may share access to the server 1202 and the database 1230, the particular data and services provided from the server 1202 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 1232 belonging to or otherwise associated with other tenants.

The multi-tenant database 1230 is any sort of repository or other data storage system capable of storing and managing the data 1232 associated with any number of tenants. The database 1230 may be implemented using any type of conventional database server hardware. In various embodiments, the database 1230 shares processing hardware 1204 with the server 1202. In other embodiments, the database 1230 is implemented using separate physical and/or virtual database server hardware that communicates with the server 1202 to perform the various functions described herein. In an exemplary embodiment, the database 1230 includes a database management system or other equivalent software capable of determining an optimal query plan for retrieving and providing a particular subset of the data 1232 to an instance of virtual application 1228 in response to a query initiated or otherwise provided by a virtual application 1228. The multi-tenant database 1230 may alternatively be referred to herein as an on-demand database, in that the multi-tenant database 1230 provides (or is available to provide) data at run-time to on-demand virtual applications 1228 generated by the application platform 1210.

In practice, the data 1232 may be organized and formatted in any manner to support the application platform 1210. In various embodiments, the data 1232 is suitably organized into a relatively small number of large data tables to maintain a semi-amorphous "heap"-type format. The data 1232 can then be organized as needed for a particular virtual application 1228. In various embodiments, conventional data relationships are established using any number of pivot tables 1234 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1236, for example, can be used to describe any number of forms, reports, workflows, user access privileges, business logic and other constructs that are common to multiple tenants. Tenant-specific formatting, functions and other constructs may be maintained as tenant-specific metadata 1238 for each tenant, as desired. Rather than forcing the data 1232 into an inflexible global structure that is common to all tenants and applications, the database 1230 is organized to be relatively amorphous, with the pivot tables 1234 and the metadata 1238 providing additional structure on an as-needed basis. To that end, the application platform 1210 suitably uses the pivot tables 1234 and/or the metadata 1238 to generate "virtual" components of the virtual applications 1228 to logically obtain, process, and present the relatively amorphous data 1232 from the database 1230.

The server 1202 is implemented using one or more actual and/or virtual computing systems that collectively provide the dynamic application platform 1210 for generating the virtual applications 1228. For example, the server 1202 may be implemented using a cluster of actual and/or virtual servers operating in conjunction with each other, typically in association with conventional network communications, cluster management, load balancing and other features as appropriate. The server 1202 operates with any sort of conventional processing hardware 1204, such as a processor 1205, memory 1206, input/output features 1207 and the like. The input/output features 1207 generally represent the interface(s) to networks (e.g., to the network 1245, or any other local area, wide area or other network), mass storage, display devices, data entry devices and/or the like. The processor 1205 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1206 represents any non-transitory short or long term storage or other computer-readable media capable of storing programming instructions for execution on the processor 1205, including any sort of random access memory (RAM), read only memory (ROM), flash memory, magnetic or optical mass storage, and/or the like. The computer-executable programming instructions, when read and executed by the server 1202 and/or processor 1205, cause the server 1202 and/or processor 1205 to create, generate, or otherwise facilitate the application platform 1210 and/or virtual applications 1228 and perform one or more additional tasks, operations, functions, and/or processes described herein. It should be noted that the memory 1206 represents one suitable implementation of such computer-readable media, and alternatively or additionally, the server 1202 could receive and cooperate with external computer-readable media that is realized as a portable or mobile component or application platform, e.g., a portable hard drive, a USB flash drive, an optical disc, or the like.

The application platform 1210 is any sort of software application or other data processing engine that generates the virtual applications 1228 that provide data and/or services to the client devices 1240. In a typical embodiment, the application platform 1210 gains access to processing resources, communications interfaces and other features of the processing hardware 1204 using any sort of conventional or proprietary operating system 1208. The virtual applications 1228 are typically generated at run-time in response to input received from the client devices 1240. For the illustrated embodiment, the application platform 1210 includes a bulk data processing engine 1212, a query generator 1214, a search engine 1216 that provides text indexing and other search functionality, and a runtime application generator 1220. Each of these features may be implemented as a separate process or other module, and many equivalent embodiments could include different and/or additional features, components or other modules as desired.

The runtime application generator 1220 dynamically builds and executes the virtual applications 1228 in response to specific requests received from the client devices 1240. The virtual applications 1228 are typically constructed in accordance with the tenant-specific metadata 1238, which describes the particular tables, reports, interfaces and/or other features of the particular application 1228. In various embodiments, each virtual application 1228 generates dynamic web content that can be served to a browser or other client program 1242 associated with its client device 1240, as appropriate.

The runtime application generator 1220 suitably interacts with the query generator 1214 to efficiently obtain multi-tenant data 1232 from the database 1230 as needed in response to input queries initiated or otherwise provided by users of the client devices 1240. In a typical embodiment, the query generator 1214 considers the identity of the user requesting a particular function (along with the user's associated tenant), and then builds and executes queries to the database 1230 using system-wide metadata 1236, tenant specific metadata 1238, pivot tables 1234, and/or any other available resources. The query generator 1214 in this example therefore maintains security of the common database 1230 by ensuring that queries are consistent with access privileges granted to the user and/or tenant that initiated the request. In this manner, the query generator 1214 suitably obtains requested subsets of data 1232 accessible to a user and/or tenant from the database 1230 as needed to populate the tables, reports or other features of the particular virtual application 1228 for that user and/or tenant.

Still referring to FIG. 12, the data processing engine 1212 performs bulk processing operations on the data 1232 such as uploads or downloads, updates, online transaction processing, and/or the like. In many embodiments, less urgent bulk processing of the data 1232 can be scheduled to occur as processing resources become available, thereby giving priority to more urgent data processing by the query generator 1214, the search engine 1216, the virtual applications 1228, etc.

In exemplary embodiments, the application platform 1210 is utilized to create and/or generate data-driven virtual applications 1228 for the tenants that they support. Such virtual applications 1228 may make use of interface features such as custom (or tenant-specific) screens 1224, standard (or universal) screens 1222 or the like. Any number of custom and/or standard objects 1226 may also be available for integration into tenant-developed virtual applications 1228. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 1226 such as "account" objects, "opportunity" objects, "contact" objects, or the like. The data 1232 associated with each virtual application 1228 is provided to the database 1230, as appropriate, and stored until it is requested or is otherwise needed, along with the metadata 1238 that describes the particular features (e.g., reports, tables, functions, objects, fields, formulas, code, etc.) of that particular virtual application 1228. For example, a virtual application 1228 may include a number of objects 1226 accessible to a tenant, wherein for each object 1226 accessible to the tenant, information pertaining to its object type along with values for various fields associated with that respective object type are maintained as metadata 1238 in the database 1230. In this regard, the object type defines the structure (e.g., the formatting, functions and other constructs) of each respective object 1226 and the various fields associated therewith.

Still referring to FIG. 12, the data and services provided by the server 1202 can be retrieved using any sort of personal computer, mobile telephone, tablet or other network-enabled client device 1240 on the network 1245. In an exemplary embodiment, the client device 1240 includes a display device, such as a monitor, screen, or another conventional electronic display capable of graphically presenting data and/or information retrieved from the multi-tenant database 1230. Typically, the user operates a conventional browser application or other client program 1242 (e.g., client application 114) executed by the client device 1240 to contact the server 1202 via the network 1245 using a networking protocol, such as the hypertext transport protocol (HTTP) or the like. The user typically authenticates his or her identity to the server 1202 to obtain a session identifier ("SessionID") that identifies the user in subsequent communications with the server 1202. When the identified user requests access to a virtual application 1228, the runtime application generator 1220 suitably creates the application at run time based upon the metadata 1238, as appropriate. As noted above, the virtual application 1228 may contain Java, ActiveX, or other content that can be presented using conventional client software running on the client device 1240; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to gesture recognition, text recognition or textual analysis, relational databases, querying and other database functions, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method comprising:
   identifying, by a server coupled to a database, a gesture with respect to a portion of textual information displayed on a graphical user interface display associated with an instance of a virtual application provided by the server on a client device;
   identifying the portion of textual information displayed on the graphical user interface display corresponding to the gesture, resulting in a gestured portion of textual information;
   determining whether the gestured portion of textual information displayed on the graphical user interface display comprises a reference to an existing database object in the database or plain text that does not comprise an existing database object;

when the gestured portion of textual information comprises a reference to an existing database object in the database:
  determining, by the server, a first database action based on spatial characteristics associated with the gesture and the existing database object;
  performing, by the server, the first database action with respect to the existing database object in the database; and
  updating, by the server, the gestured portion of textual information on the graphical user interface display to reflect the performing of the first database action; and
when the gestured portion of textual information comprises plain text that does not comprise an existing database object:
  determining, by the server an assigned database action for the spatial characteristics of the gesture when the gestured portion of textual information comprises plain text;
  determining, by the server, a database object type based on contents of the gestured portion of the plain text;
  performing, by the server, the assigned database action with respect to a database object of the database object type in the database using the gestured portion of the plain text; and
  updating, by the server, the gestured portion of the plain text on the graphical user interface display to include a hyperlink to the database object in lieu of the gestured portion of the plain text to reflect the performing of the assigned database action.

2. The method of claim 1, wherein:
determining the first database action comprises identifying an object type associated with the first database action based on the gestured portion of textual information, resulting in an identified object type associated with the first database action; and
performing the first database action comprises performing the first database action with respect to the existing database object in the database having the identified object type.

3. The method of claim 1, wherein:
determining the database object type comprises identifying the database object type associated with the assigned database action based on the contents of the gestured portion of the plain text, resulting in an identified object type associated with the assigned database action; and
performing the assigned database action comprises creating a new database object in the database having the identified object type using at least a portion of the gestured portion of the plain text.

4. The method of claim 2, wherein performing the first database action with respect to the existing database object in the database having the identified object type comprises querying for the existing database object in the database having the identified object type using at least a portion of the gestured portion of textual information.

5. The method of claim 1, the gestured portion of textual information referencing existing database objects, the existing database objects including the existing database object, wherein:
determining the first database action comprises identifying a relationship between the existing database objects based on the spatial characteristics associated with the gesture, resulting in an identified relationship; and
performing the first database action comprises modifying an association field of the existing database object to establish the identified relationship between the existing database object and another of the existing database objects in the database.

6. The method of claim 1, the gestured portion of textual information referencing existing database objects, the existing database objects including the existing database object, wherein:
determining the first database action comprises identifying a relationship between the existing database objects based on object types associated with the existing database objects, resulting in an identified relationship; and
performing the first database action comprises modifying an association field of the existing database object to establish the identified relationship between the existing database object and another of the existing database objects in the database.

7. The method of claim 1, wherein determining the first database action comprises determining the first database action based on directionality of the gesture.

8. The method of claim 1, wherein determining the first database action comprises determining the first database action based on geometric characteristics of the gesture.

9. The method of claim 1, wherein:
determining the first database action comprises determining an object type for the first database action based on a context of the gestured portion of textual information; and
performing the first database action comprises performing the first database action with respect to the existing database object in the database having the object type.

10. The method of claim 1, further comprising obtaining, by the server from the database, one or more rules maintaining associations between gestural characteristics for one or more input gestures, gestured content criteria for the respective input gesture of the one or more input gestures, and one or more database actions for the respective input gesture of the one or more input gestures associated with the gestured content criteria, wherein determining the first database action comprises identifying the first database action associated with the gestured content criteria matching the gestured portion of textual information for the gestural characteristics matching the spatial characteristics associated with the gesture on the graphical user interface display.

11. The method of claim 1, wherein determining the assigned database action comprises determining the assigned database action based on directionality of the gesture.

12. The method of claim 1, wherein determining the assigned database action comprises determining the assigned database action based on geometric characteristics of the gesture.

13. The method of claim 1, wherein determining the database object type comprises analyzing the gestured portion of the plain text to identify text indicative of the database object type of a plurality of different database object types supported by the virtual application.

14. The method of claim 1, wherein determining the database object type comprises analyzing the gestured portion of the plain text to identify text indicative of the database object type corresponding to the assigned database action.

15. The method of claim 1, wherein determining the database object type comprises a recognition engine analyzing the gestured portion of the plain text to identify text that is likely to indicate a particular type of database object of a number of different types of objects supported by the virtual application.

16. A non-transitory computer-readable medium having instructions stored thereon that are executable by a processing system of a server coupled to a database, wherein the instructions are configurable to cause the processing system to perform a method comprising the steps of:
- identifying, by the server, a gesture with respect to a portion of textual information displayed on a graphical user interface display associated with an instance of a virtual application provided by the server on a client device;
- identifying the portion of textual information displayed on the graphical user interface display corresponding to the gesture, resulting in a gestured portion of textual information;
- determining whether the gestured portion of textual information displayed on the graphical user interface display comprises a reference to an existing database object in the database or plain text that does not comprise an existing database object;
- when the gestured portion of textual information comprises a reference to an existing database object in the database:
  - determining, by the server, a first database action based on spatial characteristics associated with the gesture and the existing database object;
  - performing, by the server, the first database action with respect to the existing database object in the database; and
  - updating, by the server, the gestured portion of textual information on the graphical user interface display to reflect the performing of the first database action; and
- when the gestured portion of textual information comprises plain text that does not comprise an existing database object:
  - determining, by the server based on the spatial characteristics associated with the gesture, an assigned database action for the spatial characteristics of the gesture when the gestured portion of textual information comprises plain text;
  - determining, by the server, a database object type based on contents of the gestured portion of the plain text;
  - performing, by the server, the assigned database action with respect to a database object of the database object type in the database using the gestured portion of the plain text; and
  - updating, by the server, the gestured portion of the plain text on the graphical user interface display to include a hyperlink to the database object in lieu of the gestured portion of the plain text to reflect the performing of the assigned database action.

17. A system comprising:
a database to store one or more gesture rules; and
an application server comprising a processor coupled to the database and a network to provide an instance of a virtual application to a client device via the network, receive an input gesture associated with the instance of the virtual application from the client device, identify a gestured portion of textual information displayed on a graphical user interface display associated with the instance of the virtual application corresponding to the input gesture, determine whether the gestured portion of textual information displayed on the graphical user interface display comprises a reference to an existing database object or plain text that does not implicate an existing database object, determine a database action based on the one or more gesture rules and at least one of characteristics associated with the input gesture and whether the gestured portion of textual information comprises a reference to an existing database object, and perform the database action with respect to an object in the database in a manner that is influenced by the gestured portion of textual information, wherein:
- when the gestured portion of textual information comprises a reference to an existing database object, the database action is determined based at least in part on the existing database object and performed with respect to the existing database object; and
- when the gestured portion of textual information comprises plain text that does not comprise an existing database object:
  - an assigned database action is determined based on the spatial characteristics associated with the input gesture when the gestured portion of textual information comprises plain text and the assigned database action is performed with respect to a database object of a database object type determined based on contents of the gestured portion of the plain text; and
  - the gestured portion of the plain text is updated on the graphical user interface display to include a hyperlink to the database object of the database object type in lieu of the gestured portion of the plain text to reflect the assigned database action.

18. The system of claim 17, wherein:
the database includes a plurality of object tables; and
the application server identifies one of the plurality of object tables for the database action based on at least one of the spatial characteristics associated with the input gesture and the displayed content.

19. The system of claim 18, wherein:
the one of the plurality of object tables comprises a contact object table; and
the application server identifies the contact object table for the database action based on identifying a name of an individual within the gestured portion of textual information.

20. The system of claim 18, wherein:
the one of the plurality of object tables comprises an account object table; and
the application server identifies the account object table for the database action based on identifying a name of a business within the gestured portion of textual information.

* * * * *